(12) United States Patent
Bird

(10) Patent No.: US 7,507,022 B2
(45) Date of Patent: Mar. 24, 2009

(54) APPARATUS FOR MEASURING TEMPERATURE USING LUMINESCENCE THERMOMETRY

(75) Inventor: Colin Bird, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/385,651

(22) Filed: Mar. 22, 2006

(65) Prior Publication Data

US 2006/0188000 A1 Aug. 24, 2006

Related U.S. Application Data

(63) Continuation of application No. PCT/GB2004/003731, filed on Sep. 3, 2004.

(30) Foreign Application Priority Data

Oct. 7, 2003 (GB) ................................ 0323372.3

(51) Int. Cl.
G01K 11/00 (2006.01)
(52) U.S. Cl. ........................ 374/161; 356/43
(58) Field of Classification Search ................ 374/161; 356/43; 359/565, 566
See application file for complete search history.

(56) References Cited

U.S. PATENT DOCUMENTS

| | | | | |
|---|---|---|---|---|
| 4,223,226 A | * | 9/1980 | Quick et al. | 250/458.1 |
| 4,880,972 A | * | 11/1989 | Brogardh et al. | 250/227.18 |
| 5,036,194 A | | 7/1991 | Hazel | |
| 5,118,181 A | * | 6/1992 | Yifrach et al. | 356/30 |
| 5,161,890 A | | 11/1992 | Fima | |
| 5,232,285 A | | 8/1993 | Mannik | |
| 5,304,809 A | | 4/1994 | Wickersheim | |
| 5,803,606 A | * | 9/1998 | Petry et al. | 374/45 |
| 5,980,105 A | * | 11/1999 | Rouhet et al. | 374/161 |
| 6,123,455 A | | 9/2000 | Beshears | |

FOREIGN PATENT DOCUMENTS

EP 0 432 262 A 6/1991
JP 05164629 AB 6/1993

* cited by examiner

Primary Examiner—Brij B. Shrivastav
Assistant Examiner—Megann E Vaughn
(74) Attorney, Agent, or Firm—W. Warren Taltavull; Manelli Denison & Selter PLLC

(57) ABSTRACT

An apparatus (10) for measuring temperature using luminescence thermometry, comprising: a photon emitter (42) for providing photons (3) of at least a first frequency; photoluminescent material (30) that produces photons (5) of at least a second frequency in response to the incidence of photons (3) of the first frequency; one or more photon receivers (44); and an optically dispersive element (50) for directing photons (5) of at least a second frequency produced by the photoluminescent material (30) into the photon receiver(s).

19 Claims, 1 Drawing Sheet

APPARATUS FOR MEASURING TEMPERATURE USING LUMINESCENCE THERMOMETRY This is a continuation of International Application Number PCT/GB2004/003731 filed Sept. 3, 2004, designating the United States.

FIELD OF THE INVENTION

Embodiments of the invention relate to an apparatus for measuring, using luminescence, and in particular for measuring temperature using luminescence thermometry.

BACKGROUND OF THE INVENTION

Luminescence thermometry is presently used to determine the temperature of an object without having to make physical contact with the object.

A photoluminescent material commonly known as a thermographic phosphor is applied to the object whose temperature is to be measured. The photo luminescent material is stimulated with pulsed UV light. The photoluminescent material emits, in response, a pulse of light generally at a lower frequency (e.g. visible light). This pulse decays exponentially with time. The exponent is related to the temperature of the luminescent material and hence the temperature of the object. The pulses emitted by the photoluminescent material are collected and their decay times are measured and compared against calibrated results to determine the temperature of the object.

Alternatively, a temperature dependence of the wavelength spectrum of the emitted light is used to determine temperature.

An optical fibre is typically used to direct the incident light onto the photoluminescent material. The same fibre is used to collect the light emitted in response by the photoluminescent material. However, the use of the same fibre for emission and collection creates fluorescence which adds noise.

It would be desirable to provide an improved apparatus for luminescence thermometry and for measuring other values via luminescence.

SUMMARY OF THE INVENTION

According to one aspect of the present invention, there is provided an apparatus for measuring using luminescence, comprising: a photon emitter for providing photons of at least a first frequency; one or more photon receivers for receiving photons of at least a second frequency; characterised in that the apparatus further comprises an optically dispersive element for directing photons of at least the second frequency into the one or more photon receivers. An apparatus for measuring temperature using luminescence thermometry may comprise: a photon emitter for providing photons of at least a first frequency; one or more photon receivers; photoluminescent material that produces photons of at least a second frequency in response to the incidence of photons of the first frequency; and an optically dispersive element for directing photons of at least a second frequency produced by the photoluminescent material into the photon receiver(s).

The apparatus enables the determination of temperatures across a large temperature range.

The physical separation of photon emission and photon reception improves the efficiency of temperature detection, particularly at high temperatures where emission may become weak and may increase the high temperature range of temperature detection. It also enables the collection area for photons to be independently optimised to reduce the amount of noise from black body radiation which increases the detection efficiency at higher temperatures. This may also increase the high temperature range of temperature detection.

According to another aspect of the present invention there is provided a luminescence measuring apparatus, comprising: a radiation source; photoluminescent material that produces photons of at least one frequency in response to the incidence of radiation from the radiation source; and characterised in that it further comprises: a plurality of photon receivers; and a control mechanism for controlling which of the plurality of photon receivers are enabled. A luminescence thermometry apparatus for measuring temperature may comprise: a radiation source; a plurality of photon receivers; photoluminescent material that produces photons of at least a second frequency in response to the incidence of radiation from the radiation source; and a control mechanism for controlling which of the plurality of photon receivers are enabled.

According to a further aspect of the present invention there is provided a luminescence measuring apparatus, comprising: a radiation source; an object adapted to move in a first direction (D) and having photoluminescent material thereon, that produces photons of at least a second frequency in response to the incidence of radiation from the radiation source; and characterised in that it further comprises: a plurality of photon receivers distributed along the first direction (D). A luminescence thermometry apparatus for measuring the temperature of an object moving in a first direction may comprise: a radiation source; an object having photoluminescent material thereon, that produces photons of at least a second frequency in response to the incidence of radiation from the radiation source; and a plurality of photon receivers distributed along the first direction. The photon receivers may only be distributed along the first direction.

According to a further aspect of the present invention there is provided a method of measuring using luminescence, comprising the steps:

providing photons of at least a first frequency from a photon emitter;

directing the photons of at least a first frequency at a photoluminescent material thereby producing photons of at least a second frequency;

directing the photons of the at least a second frequency through an optically dispersive element;

wherein the optically dispersive element directs the photons of the at least a second frequency to at least one photon receiver.

BRIEF DESCRIPTION OF THE DRAWINGS

For a better understanding of the present invention and to understand how the same may be brought into effect reference will now be made by way of example only to the accompanying drawing in which.

DETAILED DESCRIPTION OF THE INVENTION

Figure 1:
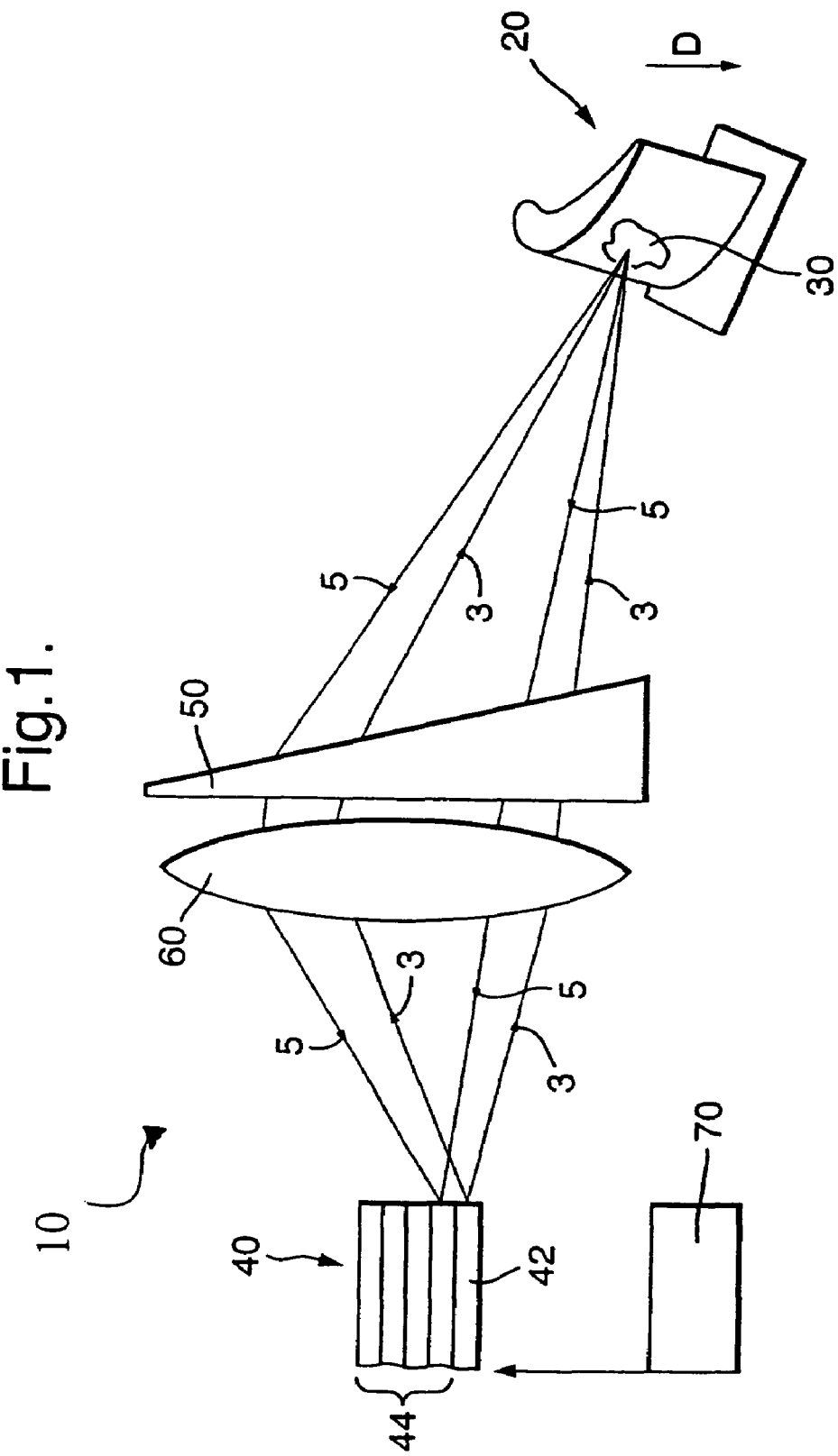
FIG. 1 illustrates an apparatus 10 for measuring the temperature of an object 20 using luminescence thermometry.

FIG. 1 illustrates an apparatus 10 for measuring the temperature of an object 20 using luminescence thermometry. The apparatus 10 comprises: the object 20 carrying photoluminescent material 30; a bundle of optical fibres 40 including a photon emitter fibre 42 and photon receiver fibres 44; an optically dispersive element 50; a lens system 60 and a detection and control mechanism 70.

A portion of the object 20 has been covered with photoluminescent material 30. When photons 3 of a first frequency (e.g. ultra violet) are incident on the photoluminescent material, it emits photons 5 of at least a second frequency (e.g. visible) in response to the incidence of the photons 3 of the first frequency.

A pulse or series of pulses of photons 3 of the first frequency are provided by the photon emitter optical fibre 42. The photons pass through the lens system 60 and dispersive element 50 and are incident on the photoluminescent material 30. The photon emitter fibre 42 is used for emission of photons and not for reception of photons.

The pulse or series of pulses of photons 5 consequently produced by the photoluminescent material 30 pass through the dispersive element 50 and the lens system 60 and are incident on one or more of the photon receiver fibres 44. The photon receiver fibres, which are adjacent the photo emitter fibre 42, convey the incident photons to the detection and control mechanism 70. Thus the detection of temperature involves the detection of photons sent via the photon receiver fibres 44 but not via the photon emitter fibre 42.

The photoluminescent material when excited by the incident photons 3 emits a pulse of photons at the lower second frequency. The pulse decays exponentially with time and the exponent is related to the temperature of the luminescent material 30 and hence the temperature of the object 20. The half-life of a decay profile varies with photoluminescent material 30 and temperature but is typically between 1 microsecond and 10 milliseconds. The photoluminescent material may be a fluorescent material, a phosphorescent material such as thermographic phosphors or a temperature sensitive paint.

The optically dispersive element 50 directs photons 5 of the second frequency, produced by the photoluminescent material, into the photon receiver fibres 44. This is achieved by the dispersion element providing angular separation of light at different frequencies. The dispersion element may be, for example, a prism, a diffraction grating or a hologram.

If a prism is used it is dimensioned depending upon the optical distances between the dispersive element 50 and the bundle of optical fibres 40, the distance between the dispersive element 50 and the photoluminescent material 30, and the refractive index of the material forming the prism. As the prism may be placed in a high temperature environment, it may need to be formed from heat resistant materials such as sapphire or fused silica.

The use of the dispersion element 50 allows the emission and reception of photons to be physically separated. This reduces interference and improves the detection efficiency, giving increased signal to noise ratios and improved upper temperature capability.

The detection and control mechanism 70 collects received photons 5 and measures decay times and compares the measured values against calibrated results to determine the temperature of the object 20. The detection and control mechanism 70 may collect photons from all or only some of the photon receiver fibres 44. Thus only some of the fibres 44 may be enabled, at any one time, as photon receivers.

The detection and control mechanism 70 is arranged to selectively determine which of the photon receiver fibres 44 are enabled. The position at which photon detection occurs and the area over which photon detection occurs can thus be selectively varied.

In applications in which the object 20 is moving e.g. a blade in a gas turbine engine, then the photon receiver fibres 44 may be arranged in a single line along the direction of movement of the object. Alternatively, the detection and control mechanism 70 may enable only the fibres 44 that are arranged in a single line along the direction of movement of the object.

When the detection and control mechanism 70 enables all of the photon receiver fibres 44 and collects photons from all of the photon detector fibres 44, then the area for detection of photons 5 is large. This compensates for the movement of the object 20 during the period of decay of a pulse of photons and improves the efficiency of detection especially at lower temperatures when decay times are longer.

When the detection and control mechanism 70 enables a sub-set of the photon receiver fibres 44 and collects photons from the sub-set of the photon detector fibres 44, then the area for detection of photons 5 is reduced. In the case where the photoluminesence decay time is shorter, for example, at high measurement temperatures, the object may move a shorter distance during the period of decay. The control mechanism 70 enables only the sub-set of the photon detector fibres which correspond to the object movement during the period of decay. This is suitable for higher temperature measurements as it limits the detection of blackbody radiation, while still allowing high collection efficiency.

The selective enabling of the photon receiver fibres 44 by the detection and control mechanism 70 enables the apparatus 10 to operate over a greater temperature range e.g. up to 1700 K.

In the example of FIG. 1, the object 20 is not in line with the optical fibres 40, lens 60 and dispersion element 50 when its temperature is measured, but is below them. The photon receiver fibres 44 are located, relative to the photon emitter fibre 42 in a direction opposition to the direction of movement D of the object 20.

Although embodiments of the present invention have been described in the preceding paragraphs with reference to various examples, it should be appreciated that modifications to the examples given can be made without departing from the scope of the invention as claimed.

For example, a probe as described may be used to evaluate human and animal tissue. Fluorescence from tissue can be used to detect cancer, monitor photodynamic therapy or pharmacokinetics, or to assay fluorescing components of metabolic processes. Variations in blood flow and tissue heterogeneity can also produce a luminescence measurement.

Additionally, a probe as described may be used to determine concentrations of components in a fluid e.g. oxygen in a gas. A luminescent component that produces a luminescence in the presence of a component to be measured is used. The luminescent component is allowed to react with the component to be measured and is subsequently excited by the probe and a reading taken substantially as described above.

Further, a probe as described may be used to measure flow-rate. By injecting a quantity of luminescent material into a mass flow of fluid and exciting and measuring the response with the probe as described it is possible to determine the speed of travel of the luminescent material within the fluid.

Whilst the above are examples where the probe of the present invention may find application, it will be appreciated that the probe may be used to determine other quantities other than those described above without departing from the inventive scope of the present invention.

The invention claimed is:

1. An apparatus for measuring temperature using luminescence, comprising:
   a first optical fiber photon emitter for providing photons of at least a first frequency;
   a plurality of second optical fiber photon receivers for receiving photons of at least a second frequency; characterized in that the apparatus further comprises;

an optically dispersive element for directing photons of at least the second frequency into the plurality of photon receivers wherein the emitted photons are carried by a separate optical fiber than the received photons; and
a control mechanism for controlling which of the plurality of photon receivers are enabled wherein the control mechanism selects a reduced number of photon receivers for the measurement of higher temperatures.

2. Apparatus as claimed in claim 1, wherein a plurality of photon receivers are provided and further comprising a detecting mechanism for detecting photons from a selected number of the plurality of photon receivers.

3. Apparatus as claimed in claim 2, wherein the selected number is less than the total number of the plurality of photon receivers.

4. An apparatus as claimed in claim 2, arranged to measure the temperature of an object moving in a first direction, wherein a plurality of photon receivers are distributed along the first direction.

5. An apparatus as claimed in claim 2, wherein the plurality of photon receivers are positioned adjacent the photon emitter.

6. An apparatus as claimed in claim 1, wherein the first optical fiber and the second optical fibers are arranged in a bundle.

7. An apparatus as claimed in claim 1, further comprising a lens system between the dispersive element and the photon receiver.

8. An apparatus as claimed in claim 1, wherein the dispersive element comprises a prism, a diffraction grating or a hologram.

9. An apparatus for measuring temperature using luminescence, comprising:
a radiation source;
photoluminescent material that produces photons of at least one frequency in response to the incidence of radiation from the radiation source; and characterized in that it further comprises:
a plurality of photon receivers; and
a control mechanism for controlling which of the plurality of photon receivers are enabled wherein the control mechanism is arranged to enable a reduced number of photon receivers for the measurement of higher temperatures.

10. An apparatus as claimed in claim 9, for measuring the temperature of an object moving in a first direction, wherein the control mechanism is arranged to enable photon receivers distributed along the first direction.

11. An apparatus as claimed in claim 9, wherein the plurality of photon receivers are positioned adjacent the radiation source.

12. An apparatus as claimed in claim 11, wherein the photon receivers and the radiation source are provided by separate optical fibers in a bundle of optical fibers.

13. An apparatus as claimed in claim 9, further comprising an optically dispersive element for directing photons of at least a second frequency produced by the photoluminescent material into the photon receiver(s).

14. An apparatus as claimed in claim 13, wherein the dispersive element comprises one of a prism, a diffraction grating or a hologram.

15. An apparatus as claimed in claim 9, further comprising a lens system between the dispersive element and the or each photon receiver.

16. An apparatus for measuring temperature using luminescence, comprising:
a radiation source;
an object adapted to move in a first direction and having photoluminescent material thereon, that produces photons of at least a second frequency in response to the incidence of radiation from the radiation source; and characterized in that it further comprises:
a plurality of optical fiber photon receivers distributed along the first direction; and
a control mechanism for controlling which of the plurality of photon receivers are enabled wherein the control mechanism selects a reduced number of photon receivers for the measurement of higher temperatures.

17. A method of measuring temperature using luminescence, comprising the steps:
providing photons of at least a first frequency from a first optical fiber photon emitter;
directing the photons of at least a first frequency at a photoluminescent material thereby producing photons of at least a second frequency;
directing the photons of the at least a second frequency through an optically dispersive element;
wherein the optically dispersive element directs the photons of the at least a second frequency to a plurality of second optical fiber photon receivers and wherein the emitted photons are carried by a separate optical fiber than the received photons and wherein a control mechanism selectively determines which of the plurality of photon receivers are enabled wherein the control mechanism selects a reduced number of photon receivers for the measurement of higher temperatures.

18. A method according to claim 17, wherein the photons of the at least a second frequency are indicative of temperature.

19. An apparatus for measuring temperature using luminescence, comprising:
a photon emitter for providing photons of at least a first frequency;
one or more photon receivers for receiving photons of at least a second frequency; characterized in that the apparatus further comprises
an optically dispersive element for directing photons of at least the second frequency into the one or more photon receivers wherein a plurality of photon receivers are provided and further comprising a control mechanism for controlling which of the plurality of photon receivers are enabled wherein the apparatus measures temperature, the control mechanism being arranged to select a reduced number of photon receivers for the measurement of higher temperatures.

* * * * *